US007974417B2

(12) United States Patent
Kim et al.

(10) Patent No.: US 7,974,417 B2
(45) Date of Patent: Jul. 5, 2011

(54) MULTI-CHANNEL BASS MANAGEMENT

(76) Inventors: Wontak Kim, Cambridge, MA (US); George Nichols, Dover, MA (US); Guy A. Torio, Ashland, MA (US)

(*) Notice: Subject to any disclaimer, the term of this patent is extended or adjusted under 35 U.S.C. 154(b) by 1772 days.

(21) Appl. No.: 11/104,746

(22) Filed: Apr. 13, 2005

(65) Prior Publication Data

US 2006/0233378 A1 Oct. 19, 2006

(51) Int. Cl.
*H04R 5/00* (2006.01)
*H04B 1/00* (2006.01)
*G10L 19/00* (2006.01)

(52) U.S. Cl. .................. 381/1; 381/17; 381/18; 381/19; 381/119; 704/500; 704/501

(58) Field of Classification Search .......... 381/1, 17–23, 381/99, 98, 103, 61, 302–310; 704/501, 704/500
See application file for complete search history.

(56) References Cited

U.S. PATENT DOCUMENTS

| | | | | |
|---|---|---|---|---|
| 5,764,777 | A | 6/1998 | Goldfarb et al. | |
| 5,912,976 | A * | 6/1999 | Klayman et al. | 381/18 |
| 6,285,767 | B1 * | 9/2001 | Klayman | 381/17 |
| 6,332,026 | B1 | 12/2001 | Kuusama et al. | |
| 6,349,285 | B1 * | 2/2002 | Liu et al. | 704/500 |
| 7,391,869 | B2 * | 6/2008 | Eid et al. | 381/22 |
| 2004/0125967 | A1 * | 7/2004 | Eid et al. | 381/99 |

FOREIGN PATENT DOCUMENTS

| | | |
|---|---|---|
| WO | WO 02/065815 | 8/2002 |
| WO | WO 2005/004537 | 1/2005 |

OTHER PUBLICATIONS

Chinese Office Action dated Jun. 5, 2009 for CN Appl. No. 200680018044.0.

Examination Report in EP Application No. 06749780.0, dated Sep. 3, 2008.

"Bass Handling in Spatial Reproduction the Role of Multiple Low-Frequency Signals," Journal of the Audio Engineering Society. Audio Engineering Society, New York, NY U.S. vol. 52, No. 9 Sep. 2004, pp. 962-964, 966.

CN Office Action dated Jan. 22, 2010 for CN Appl. No. 200680018044.0.

EP Notice of Allowance dated Jul. 2, 2010 for EP Appl. No. 06749780.0.

CN Office Action dated Jun. 28, 2010 for CN Appl. No. 200680018044.0.

* cited by examiner

*Primary Examiner* — Devona E Faulk
(74) *Attorney, Agent, or Firm* — Bose Corporation

(57) ABSTRACT

A multi-channel audio system including first combining circuitry, for combining a first spectral band of a first plurality channels to provide a first bass audio signal stream; second combining circuitry, for combining the first spectral band of a second plurality channels to provide a second bass audio signal stream; and third combining circuitry, for combining a second spectral band, the second spectral band including lower frequencies than the first spectral band, of the first plurality of channels and the second plurality of channels to provide a third bass audio signal stream.

26 Claims, 11 Drawing Sheets

| Loudspeaker | Audio Signal Streams |
|---|---|
| 46FL | 0.7 Lout + 0.3 Cout + 1.0 ABass + 1.0 FBass |
| 46FR | 0.7 Rout + 0.3 Cout + 1.0 ABass + 1.0 FBass |
| 44FC | 0.2 Lout + 0.2 Rout + 0.6 Cout |
| 46IL | 0.5 Lout + 0.5 LSout + 1.0 RBass + 1.0 ABass |
| 46IR | 0.5 Rout + 0.5 RSout + 1.0 RBass + 1.0 ABass |
| 46BL | 1.0 LSout + 1.0 RBass |
| 46BR | 1.0 RSout + 1.0 RBass |
| 48 | 1.0 Rbass + 1.0 ABass |

FIG. 7

MULTI-CHANNEL BASS MANAGEMENT

This specification describes the management of the bass portion of a multi-channel audio system.

SUMMARY OF THE INVENTION

In one aspect of the invention, an audio system having a plurality of input channels, a method for processing audio signals includes a first combinatorial processing of a first group of the plurality channels to provide a first bass audio signal stream including frequencies in a first spectral band; a second combinatorial processing of a second group of the plurality of channels to provide a second bass audio signal stream including frequencies in the first spectral band; and a third combinatorial processing of the plurality of channels to provide a third bass audio signal stream including frequencies in a second spectral band, the second spectral band including lower frequencies than the first spectral band.

The first combinatorial processing may include combining front channels and the second combinatorial processing may include combining rear channels.

The first combinatorial processing may include combining left hemisphere channels and the second combinatorial processing may include combining right hemisphere channels.

The first combinatorial processing may include combining first adjacent directional channels of a multichannel audio system and the second combinatorial processing may include combining second adjacent channels of a multichannel audio system.

The method for processing audio signals may also include transmitting the first bass audio signal stream to a first full range loudspeaker for transduction to acoustic energy corresponding to the first bass audio signal stream; and transmitting the second bass audio signal stream to a second full range loudspeaker for transduction to acoustic energy corresponding to the second bass audio signal stream.

The method for processing audio signals may further include transmitting the third bass audio signal stream to a woofer or subwoofer loudspeaker for transduction to acoustic energy corresponding to the third bass audio signal stream.

The method for processing audio signals may further comprising combining the second bass audio signal stream and the third bass audio signal stream to provide a combined bass audio signal stream.

The method for processing audio signals may further include transmitting the combined audio signal stream to a first full range loudspeaker for transduction to acoustic energy The method for processing audio signals may further include transmitting the combined audio signal to a woofer or subwoofer loudspeaker for transduction to acoustic energy.

The method for processing audio signals may further include a first transmitting, of the first bass audio signal stream to a first loudspeaker; and second transmitting, of the second bass audio signal stream to a second loudspeaker; and a third transmitting, of the third bass audio signal stream to a third loudspeaker.

The method for processing audio signals may further include combining the first bass audio stream, the second bass audio signal stream, and the third bass audio signal stream to provide a combined bass audio signal stream; and transmitting the combined bass audio signal stream to the third loudspeaker for transduction to acoustic energy corresponding to the combined bass audio signal stream.

The combining may include scaling the first audio signal stream and the third bass signal stream.

The first combinatorial processing may include combining the first group of the plurality of channels to create a first combined signal and filtering the combined signal with a band pass filter.

The filtering may include filtering the first combined audio signal with a band pass filter that has an upper break frequency of less than 300 Hz.

The third combinatorial processing may include combining the plurality of channels to create a combined signal and filtering the combined signal with a filter that attenuates frequencies above about 80 Hz.

The filtering may include filtering with a low pass filter.

The filtering may include filtering with a band pass filter.

The method for processing audio signals may further include a first filtering, of one of the first group of the plurality of channels to provide a first high frequency audio signal stream; a second filtering, of another of the first group of the plurality of channels to provide a second high frequency audio signal stream; a third filtering, of one of the second group of the plurality of channels to provide a third high frequency audio signal stream; and a fourth filtering, of another of the second group of the plurality of channels to provide a fourth high frequency audio signal stream.

The method may further include transmitting the first high frequency audio signal stream to a first loudspeaker for transduction to acoustic energy; transmitting the second high frequency audio signal stream to a second loudspeaker for transduction to acoustic energy; transmitting the third high frequency audio signal stream to a third loudspeaker for transduction to acoustic energy; transmitting the fourth high frequency audio signal stream to a fourth loudspeaker for transduction to acoustic energy; transmitting the first bass audio signal stream to the first loudspeaker and the second loudspeaker for transduction to acoustic energy; and transmitting the second bass audio signal stream to the third loudspeaker and the fourth loudspeaker for transduction to acoustic energy.

The method may further include transmitting the third bass audio signal stream to a woofer or subwoofer audio loudspeaker for transduction to acoustic energy.

The filtering of at least one of the plurality of input channels may include filtering the input channel signal with a high pass filter.

The combinatorial processing may include filtering the plurality of input channels to provide a high frequency spectral portion, a low frequency spectral portion, and a very low frequency spectral portion for each of the plurality of channels; combining the low frequency portion of a first subset of the plurality of spectral portions to provide a first combined low frequency audio signal stream; combining the low frequency portion of a second subset of the plurality of spectral portions to provide a second combined low frequency audio signal stream, wherein the first subset and the second subset are not identical; and combining the very low frequency portion of the plurality of input channels to provide a very low frequency signal stream.

In another aspect of the invention, a multi-channel audio system may include first combining circuitry, for combining a first spectral band of a first plurality channels to provide a first bass audio signal stream; second combining circuitry, for combining the first spectral band of a second plurality channels to provide a second bass audio signal stream; and third combining circuitry, for combining a second spectral band, the second spectral band including lower frequencies than the first spectral band, of the first plurality of channels and the second plurality of channels to provide a third bass audio signal stream.

The first combining circuitry may include elements for combining front channels and the second combining circuitry may include elements for combining rear channels.

The first combining circuitry may include elements for combining left hemisphere channels and the second combining circuitry may include elements for combining right hemisphere channels.

The multi-channel audio system may further include first transmitting circuitry, for transmitting the first bass audio signal stream to a first full range loudspeaker for transduction to acoustic energy corresponding to the first bass audio signal stream; and second transmitting circuitry, for transmitting the second bass audio signal stream to a second full range loudspeaker for transduction to acoustic energy corresponding to the second bass audio signal stream.

The multi-channel audio system may include third transmitting circuitry, for transmitting the third bass audio signal stream to a woofer or subwoofer loudspeaker for transduction to acoustic energy corresponding to the third bass audio signal stream.

The multi-channel audio may include fourth combining circuitry for combining the second bass audio signal stream and the third bass audio signal stream to provide a combined bass audio signal stream.

The multi-channel audio may include fourth transmitting circuitry for transmitting the combined audio signal stream to a first full range loudspeaker for transduction to acoustic energy.

The multi-channel audio may include fifth transmitting circuitry for transmitting the combined audio signal to a woofer or subwoofer loudspeaker for transduction to acoustic energy.

The multi-channel audio may include first transmitting circuitry, for transmitting the first bass audio signal stream to a first loudspeaker; second transmitting circuitry, for transmitting the second bass audio signal stream to a second loudspeaker; and third transmitting circuitry, for transmitting the third bass audio signal stream to a third loudspeaker.

The multi-channel audio may include transmitting circuitry for transmitting the second audio signal stream to the third loudspeaker; combining circuitry, for combining the first audio signal stream with the bass audio signal streams to provide a combined audio signal stream; and transmitting the combined audio signal stream to the third loudspeaker.

The multi-channel audio system may include circuitry comprises a scaler for scaling the first audio signal stream and the third bass signal stream.

The first combining circuitry may include circuitry for combining the first plurality of channels to create a first combined signal and filtering the combined signal with a band pass filter.

The filtering circuitry may include a band pass filter that has an upper break frequency of less than 300 Hz.

The third combining circuitry may include circuitry for combining the plurality of channels to create a combined signal and filtering the second combined signal with a low pass filter.

The multi-channel audio system may further include a first high pass filter, for filtering one of the first plurality of channels to provide a first high frequency audio signal stream; a second high pass filter, for filtering another of the first plurality of channels to provide a second high frequency audio signal stream; a third high pass filter, for filtering one of the second plurality of channels to provide a third high frequency audio signal stream; and a fourth high pass filter, for filtering another of the second plurality of channels to provide a fourth high frequency audio signal stream.

The multi-channel audio system may further include first transmitting circuitry, for transmitting the first high frequency audio signal stream to a first loudspeaker for transduction to acoustic energy; second transmitting circuitry, for transmitting the second high frequency audio signal stream to a second loudspeaker for transduction to acoustic energy; third transmitting circuitry, for transmitting the third high frequency audio signal stream to a third loudspeaker for transduction to acoustic energy; fourth transmitting circuitry, for transmitting the fourth high frequency audio signal stream to a fourth loudspeaker for transduction to acoustic energy; fifth transmitting circuitry, for transmitting the first bass audio signal stream to the first loudspeaker and the second loudspeaker for transduction to acoustic energy; and sixth transmitting circuitry, for transmitting the second bass audio signal stream to the third loudspeaker and the fourth loudspeaker for transduction to acoustic energy.

The multi-channel audio system may further include seventh transmitting circuitry, for transmitting the third bass audio signal stream to a woofer or subwoofer audio loudspeaker for transduction to acoustic energy.

Other features will become apparent from the following description and claims. The audio system described in this specification is best understood by reference to the drawing, in which:

BRIEF DESCRIPTION OF THE SEVERAL VIEWS OF THE DRAWING

FIG. 7 is a chart showing the contents of the audio signal streams transmitted to the various loudspeakers in one implementation of the audio system.

DETAILED DESCRIPTION

Figure 1:
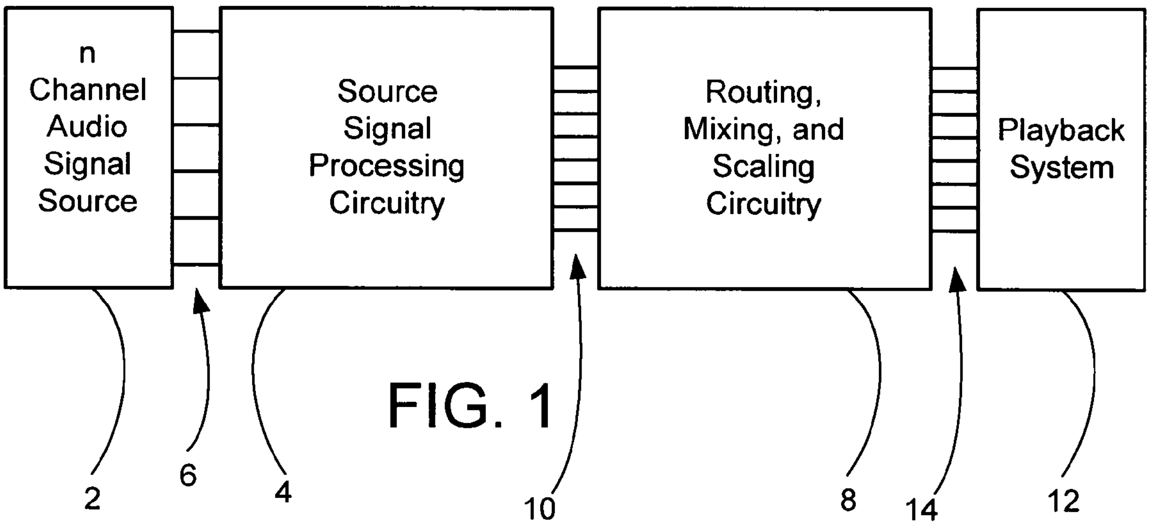
FIG. 1 is a block diagram of a multi-channel audio system.

Though the elements of the several views of the drawing are shown as discrete elements in a block diagram and are referred to as "circuitry", unless otherwise indicated, the elements may be implemented as a microprocessor executing software instructions, which may include digital signal processing (DSP) instructions. Unless otherwise indicated, signal lines may be implemented as discrete analog signal lines, as a single discrete digital signal line with appropriate signal processing to process separate streams of audio signals, or as elements of a wireless communication system. If the signal lines are implemented as a single discrete signal line, the number and nature of the input and output terminals of the elements may be implemented as single input and output terminals. Unless otherwise noted, audio signals may be either encoded in either digital or analog form.

For simplicity of wording "channel x" may be used instead of "audio signals corresponding to channel x." For example "Channel Lin is high pass filtered" means that that the audio signals corresponding to channel Lin are high pass filtered.

In general, this specification describes an audio system that is configured to combine spectral bands of directional channels to form multiple bass streams. Each of the multiple bass streams may be a linear combination of a spectral band of two or more input channels.

The audio spectrum is divided into frequency bands. The bass frequency band is divided into two frequency bands, a low frequency band and a very low frequency band. The very low frequency bands from all the directional channels and the low frequency effects channel, if present, are combined to provide a single monaural very low frequency audio signal stream. The low frequency bands from combinations of subsets of the directional channels are combined to provide bass zone audio signal streams. The bass zone audio signal streams are combinations of a subset of the directional input channels that represent bass acoustic energy intended to originate in an area less specific than the high frequency acoustic energy and to originate in an area more specific than the very low frequency bass acoustic energy.

Conventional audio systems are typically configured to combine the bass spectral portion of the directional channels to provide a single monaural bass signal (which may be combined with a low frequency effects channels, if present) and to provide discrete high frequency directional output channels corresponding to the input channels; or to provide full range output channels corresponding to the directional input channels.

An audio system according to the specification has advantages over conventional audio systems. The very low frequency audio signal stream is not routed to any loudspeaker that would be overloaded by the signal, but may be routed to any loudspeaker in the system capable of reproducing the very low frequency audio signal stream. The very low frequency spectral portion, for which there is little advantage in maintaining directionality, can be radiated by a single loudspeaker that is especially suited to radiating very low frequencies. This maximizes the headroom of the complete system and allows great flexibility in selection of loudspeaker capabilities. The high frequency spectral portion of the directional channels can be radiated by small, conveniently placed loudspeakers, while the low frequency spectral portions can be radiated by loudspeakers that maintain some directionality.

With reference now to the drawing and more particularly to FIG. 1, there is shown a block diagram of an audio system. An n-channel audio signal source 2 is communicatingly coupled to source signal processing circuitry 4 by signal lines 6. Source signal processing circuitry 4 is communicatingly coupled to routing, mixing, and scaling circuitry 8 by signal lines 10. Routing, mixing, and scaling circuitry 8 is coupled to elements of playback system 12 by signal lines 14.

N-channel audio signal source 2 may be a conventional source of audio signals, such as a CD or DVD player or a radio tuner. The examples following will use a 5.1 (i.e. n=5.1, where ".1" refers to a limited bandwidth low frequency effects channel) channel source. The audio signal source could have more than five directional channels (i.e. n=6.1, 7.1, . . . ) and may not have the low frequency effects channel (i.e. n=5, 6, 7, . . . ). The five directional channels in a 5 or 5.1 channel system typically include a left, right, center, left surround, and right surround channels. Hereinafter, the left, right, and center channels may be referred to as "front" channels, while the right surround and left surround channels may be referred to as "rear" channels. In systems having more than five channels, channels that are intended to represent a source in the front hemisphere relative to a normal listening location may be considered "front" channels and channels that are intended to represent a source in the rear hemisphere relative to a normal listening position may be considered "rear" positions. Channels that are intended to represent channels directly to the left or directly to the right of a normal listening position may be considered either front channels, rear channels, both front and rear channels, or neither front not rear channels. Channels that are intended to represent a source in the left hemisphere relative to a normal listening location may be considered "left hemisphere" channels and channels that are intended to represent a source in the right hemisphere relative to a normal listening position may be considered "right hemisphere" channels. Center or center surround channels may be considered left hemisphere or right hemisphere channels, or both hemispheres, or neither hemisphere.

Source signal processing circuitry 4 receives as input signals the n channels from the audio signal source, processes the signals, and provides as output streams of audio signals that have a directionality and spectral content appropriate for the playback system 12. Included in the streams of audio signals are multiple streams of audio signals in the bass frequency range. The number and nature of the bass audio signal streams depends on the number, capabilities, and location of speakers that radiate bass acoustic energy. The source signal processing circuitry 4 will be discussed in more detail in the discussion of FIGS. 2A and 2B. Routing, mixing, and scaling circuitry 8 receives as input the multiple streams of audio signals from source signal processing circuitry 4 and outputs streams of audio signals that are appropriate for each of the elements of the playback system 12. The routing, mixing, and scaling circuitry 8 will be discussed in more detail below. Playback system 12 includes electroacoustical transducers, amplifiers, equalizers, compressors, clippers, and like elements typically associated with transduction of audio signals to acoustic energy. Examples of combinations of electroacoustical transducers will be described below in the discussion of FIGS. 4A-4E and 5.

Figure 2A:
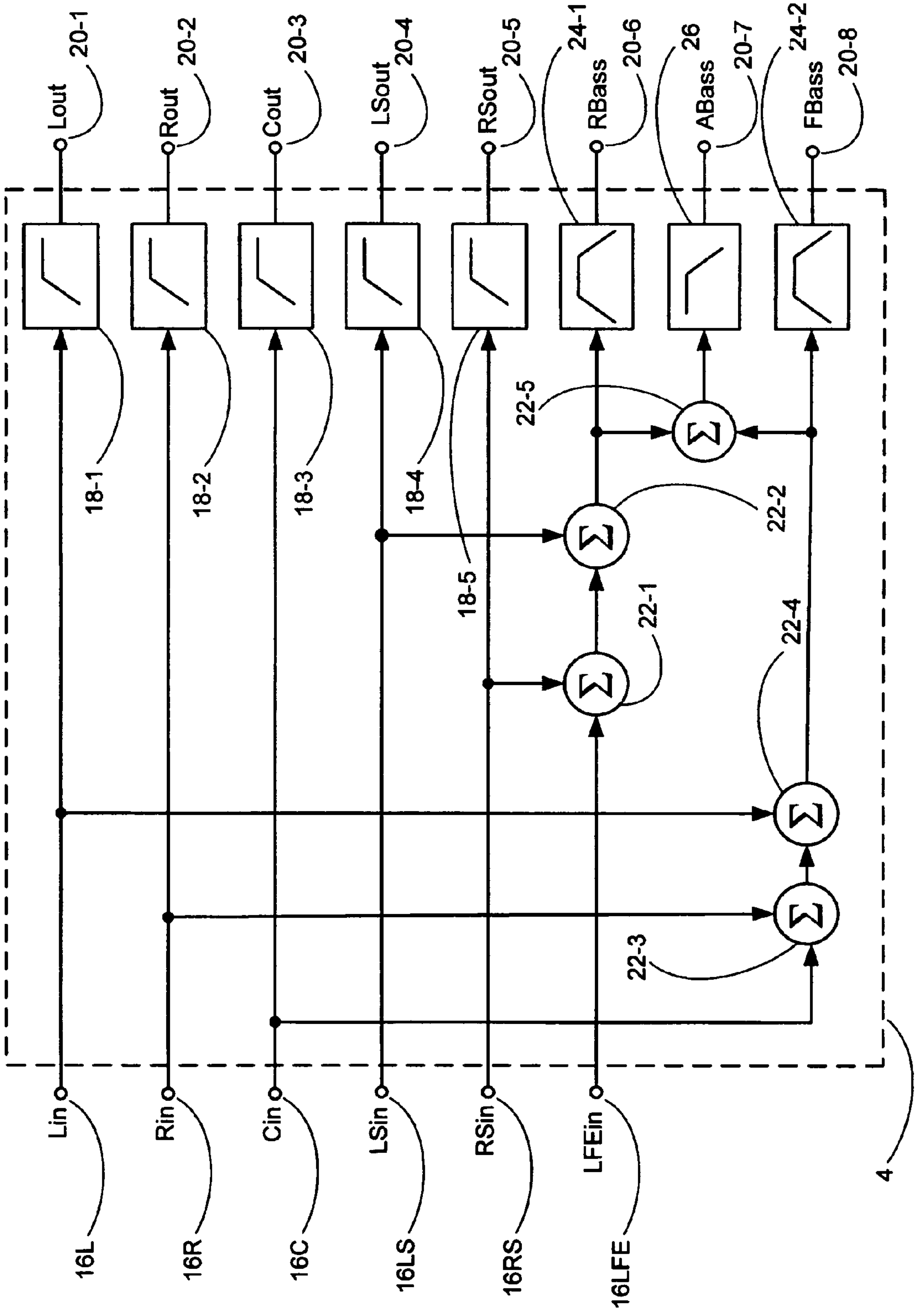
FIGS. 2A and 2B are block diagrams of a portion of the multi-channel audio system of FIG. 1, with showing one of the elements in greater detail.

FIG. 2A shows an implementation of source signal processing circuitry 4 in more detail. Source signal processing circuitry has six input terminals 16L, 16R, 16C, 16LS, 16RS, and 16LFE corresponding to the n channels (labeled, respectively, Lin, Rin, Cin, LSin, RSin, and LFEin), of audio signal source 2.

Channel Lin is high pass filtered by high pass filter 18-1 to provide output audio stream Lout at output terminal 20-1. Channel Rin is high pass filtered by high pass filter 18-2 to provide output audio stream Rout at output terminal 20-2. Channel Cin is high pass filtered by high pass filter 18-3 to provide output audio stream Cout at output terminal 20-3. Channel LSin is high pass filtered by high pass filter 18-4 to provide output audio stream LSout at output terminal 20-4. Channel RSin is high pass filtered by high pass filter 18-5 to provide output audio stream RSout at output terminal 20-5. Channel LFEin is combined with channel RSin at summer 22-1 and with channel LSin at summer 22-2 and band pass filtered at band pass filter 24-1 to provide output rear bass audio audio stream RBass at output terminal 20-6. Channel Cin is combined with channel Rin at summer 22-3 and with channel Lin at summer 22-4 and band pass filtered at band pass filter 24-2 to provide output front bass audio stream FBass at output terminal 20-8. For clarity, summers 22-1 and 22-2 are shown as a pair of summers, and summers 22-3 and 22-4 are shown as a pair of summers. Each of the pairs of summers can also be implemented as a single summer with multiple input terminals. The output signals from summers 22-2 and 22-4 are combined at summer 22-5 and low pass filtered at low pass filter 26 to provide all bass audio stream ABass at output terminal 20-7. Summers 22-1-22-5 may incorporate the bass signal combining techniques described in U.S. patent application Ser. No. 09/735,123, filed Dec. 12, 2000, entitled "Phase Shifting Audio Signal Combining". Many other combinations of summers and low pass, high pass, and band pass filters may be used to produce audio signal streams containing different combinations of signals. For example, the RBass signal may include LSin and RSin (but not LFEin) band passed. The specific combinations of input signals and the filters that are applied depend on the number, location, frequency range capability of the elements of the playback system 12, and will be discussed below.

Figure 2B:
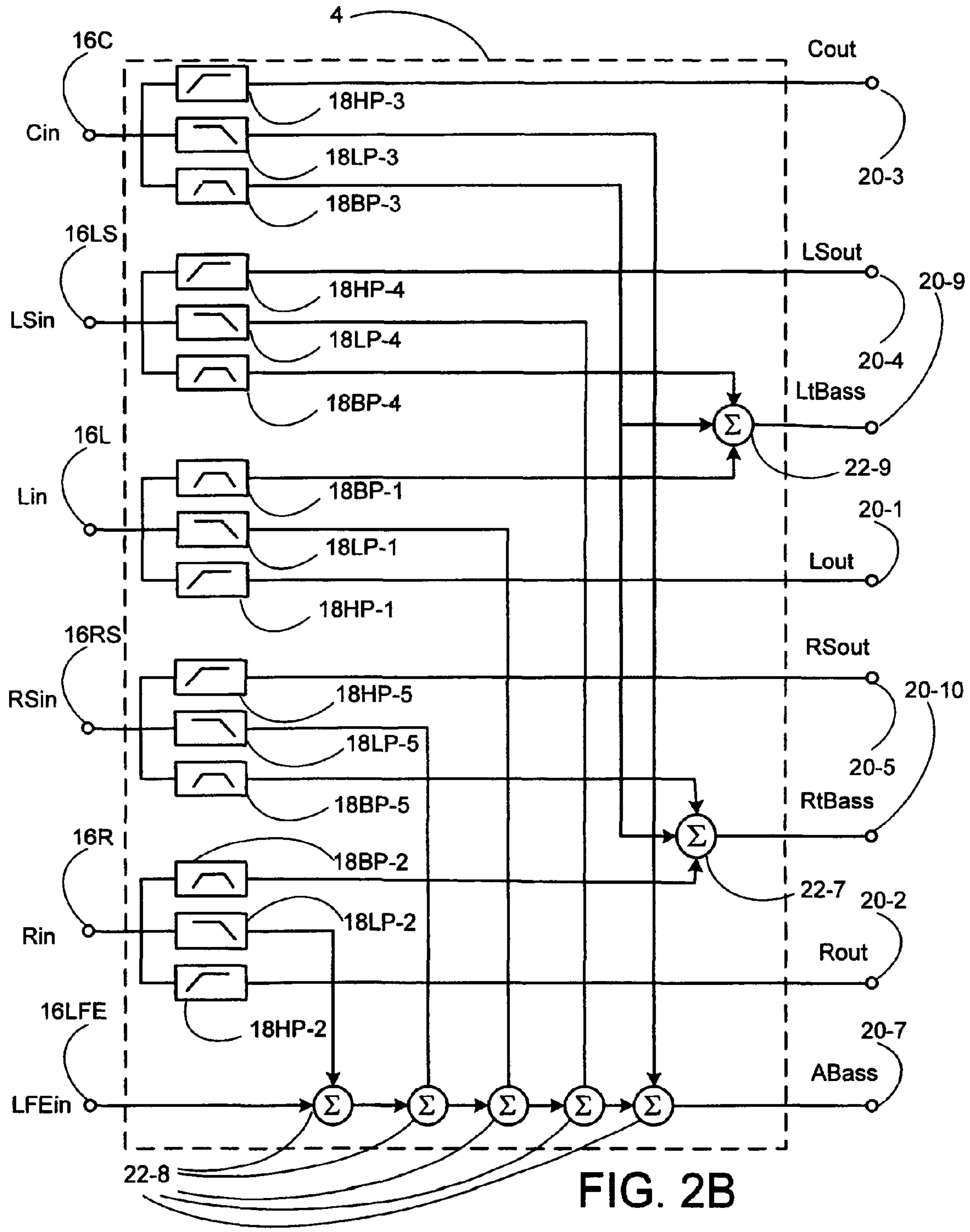

FIG. 2B shows another implementation of source signal processing circuitry 4. In the implementation of FIG. 2B, the directional input channels Lin, Rin, Cin, LSin, and RSin are filtered by high pass filters 18HP-1-18HP-5, respectively, to provide output audio streams Lout, Rout, Cout, LSout, and RSout, respectively at output terminals 20-1-20-5, respectively. The directional channels are also filtered by band pass filters 18BP-1-18BP-5, respectively, and by low pass filters 18LP-1-18LP-5, respectively. The band passed L, LS, and C signals are combined at summer 22-9 to provide left bass output audio stream LtBass at output terminal 20-9. The band passed R, RS, and C signals are combined at summer 22-7 to provide output audio stream RtBass at output terminal 20-10. The low passed L, R, C, LS, RS, and the LFE signals are combined at summers 22-8 to provide the ABass audio signal stream at output terminal 20-7. Summers 22-8 can be multiple summers as shown or may include one or more summers with multiple input terminals. The implementation of FIG. 2B shows that the multiple bass streams do not need to be combinations of the front and rear channels, but may also be combinations of left and right channels. The implementations of FIGS. 2A and 2B also show that the filtering can be done either prior to or after the combining.

The implementations of FIGS. 2A and 2B may be combined in more complex arrangements. For example, input channels in a 7.1 or 8.1 channel system could be filtered and combined to provide left front bass, right front bass, left rear bass, and right rear bass audio signal streams. Similar to FIG. 2A, any plurality of the summers can be implemented by a single summer with multiple input terminals.

Figure 3:
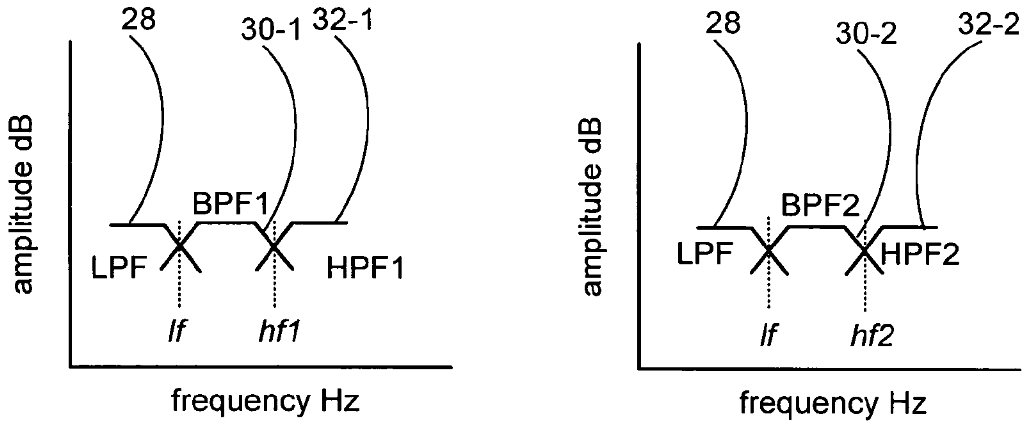
FIG. 3 show curves showing frequency responses of some of the elements of FIGS. 1, 2A and 2B.

FIG. 3 shows the crossover characteristics of the filters of FIGS. 2A and 2B. Curve 28 may represent the frequency response of low pass filter 26 of FIG. 2A or one of more of 18LP-1-18LP-5 of FIG. 2B, curve 30-1 may represent the frequency response of band pass filter 24-2 of FIG. 2A or one or more of 18BP-1-18BP-5 of FIG. 2B; curve 30-2 may represent the frequency response of band pass filter 24-1 of FIG. 2 or one or more of band pass filters 18L-1-18LP-5 of FIG. 2B; curve 32-1 may represent the frequency response of high pass filters 18-1, 18-2, and 18-3 of FIG. 2A or some or all of high pass filters 18HP-1-18HP-5 of FIG. 2B; and curve 32-2 may represent the frequency response of high pass filters 18-4 and 18-5 of FIG. 2A or some or all of high pass filters 18HP-1-18HP-5 of FIG. 2B. Typically crossover frequency lf between low pass filter 26 and band pass filter 24-1 is the same as crossover frequency lf between low pass filter 26 and band pass filter 24-2. Crossover frequency hf1 between band pass filter 24-1 and high pass filters 18-1, 18-2, and 18-3 may be the same or may be different than crossover frequency hf2 between band pass filter 24-2 and high pass filters 18-4 and 18-5. In some implementations, the frequency response of high pass filter 18-4 may be different from the frequency response of high pass filter 18-5, so the crossover frequency between high pass filters 18-4 and 18-5 and band pass filter 24-1 are different. Similarly, the frequency response of high pass filter 18-1, the frequency response of high pass filter 18-2, and the frequency response of high pass filter 18-3 may be different so that the crossover frequency between band pass filter 24-2 and high pass filters 18-1, 18-2, and 18-3 are different. In one implementation, crossover frequency lf is 80 Hz and crossover frequencies hf1 and hf2 are less than 300 Hz, for example 200 Hz. In this specification, frequencies below lf may be referred to as "very low frequencies" and frequencies above lf but below hf1 and hf2 may be referred to as "low frequencies."

In other implementations, low pass filter 26 may be a band pass filter, with a low frequency break point set to filter out low frequency noise signals and similarly one or more of high pass filters 18-1-18-5 may be band pass filters to filter out high frequency noise. Any of the filters can be implemented as an acoustic filter, for example by radiating the output signal streams to loudspeakers with acoustic drivers and loudspeaker enclosures designed to cause acoustic roll off at appropriate frequencies. Filtering can also be done electrically, with either active or passive elements.

The output terminals 20-1-20-7 of FIG. 2A and output terminals 20-1-20-10 of FIG. 2B are mixed and routed by routing, mixing, and scaling circuitry 8 and output as streams of audio signals to playback system 12.

Figure 4A:
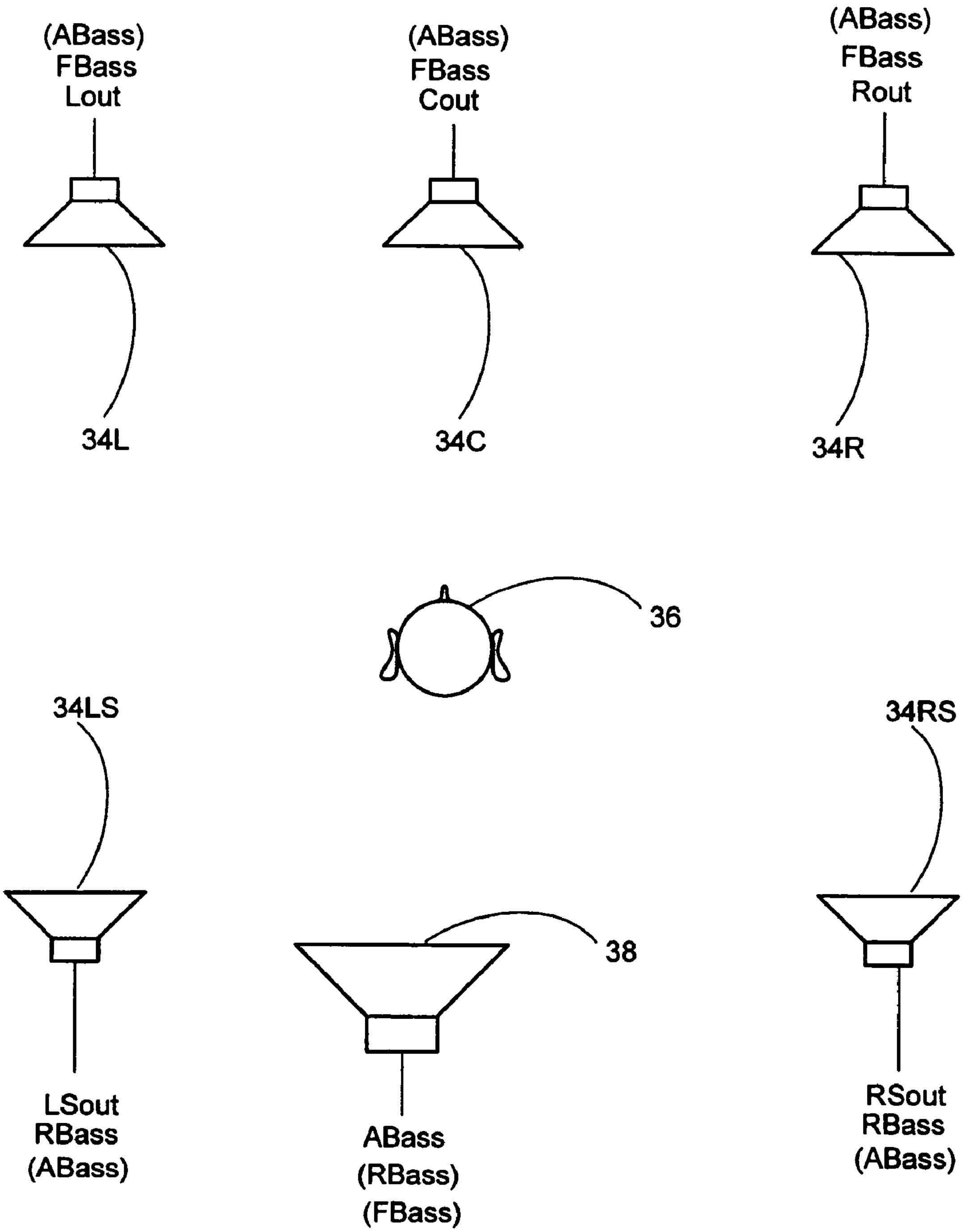
FIGS. 4A-4E are diagrammatic views of alternate implementations of the audio system.

Referring to FIG. 4A, there is shown an exemplary playback system 12 of FIG. 1. Elements other than loudspeakers, such as amplifiers, equalizers, compressors, clippers, and the like are not shown in this view. The playback system includes full range loudspeakers 34L, 34R, 34C, positioned in front of and to the left, right, and center, respectively, of listener 36 in an intended listening position. The playback system also includes full range loudspeakers 34LS and 34RS, positioned behind and to the left and right, respectively, of listener 36. The playback system also includes subwoofer 38 positioned, at a convenient location, in this example behind listener 36; the location of subwoofer 38 is not as important as the location of the other loudspeakers. Routing, mixing, and scaling circuitry 8 of FIG. 1 is configured to transmit to loudspeaker 34L audio signal streams FBass and Lout and optionally audio signal stream ABass; to transmit to loudspeaker 34C audio signal streams FBass and Cout and optionally audio signal stream ABass; to transmit to loudspeaker 34R audio signal streams FBass and Rout and optionally audio stream ABass; to loudspeaker 34LS audio signal streams RBass and LSout and optionally audio stream ABass; to transmit to loudspeaker 34RS audio signal streams RBass and RSout and optionally audio stream ABass; and to transmit to subwoofer 38 audio stream ABass and optionally audio stream RBass or audio stream FBass, or both, depending on the location of the subwoofer and other criteria. Loudspeakers 34L-34RS and subwoofer 38 transduce the audio signal streams to acoustic energy corresponding to the audio signal streams. If audio stream ABass is radiated by all six loudspeakers, then the frequency response at the location of listener 36 may contain more acoustic energy corresponding to the ABass audio signal stream than acoustic energy corresponding to other audio signal streams. It may be desirable for routing, mixing, and scaling circuitry 8 of FIG. 1 to attenuate (that is to scale, by a factor <1) the amplitude of the ABass audio stream transmitted to the loudspeakers to obtain the proper balance of acoustic energy corresponding to the ABass audio signal stream with acoustic energy corresponding to the other audio signal streams.

Figure 4B:
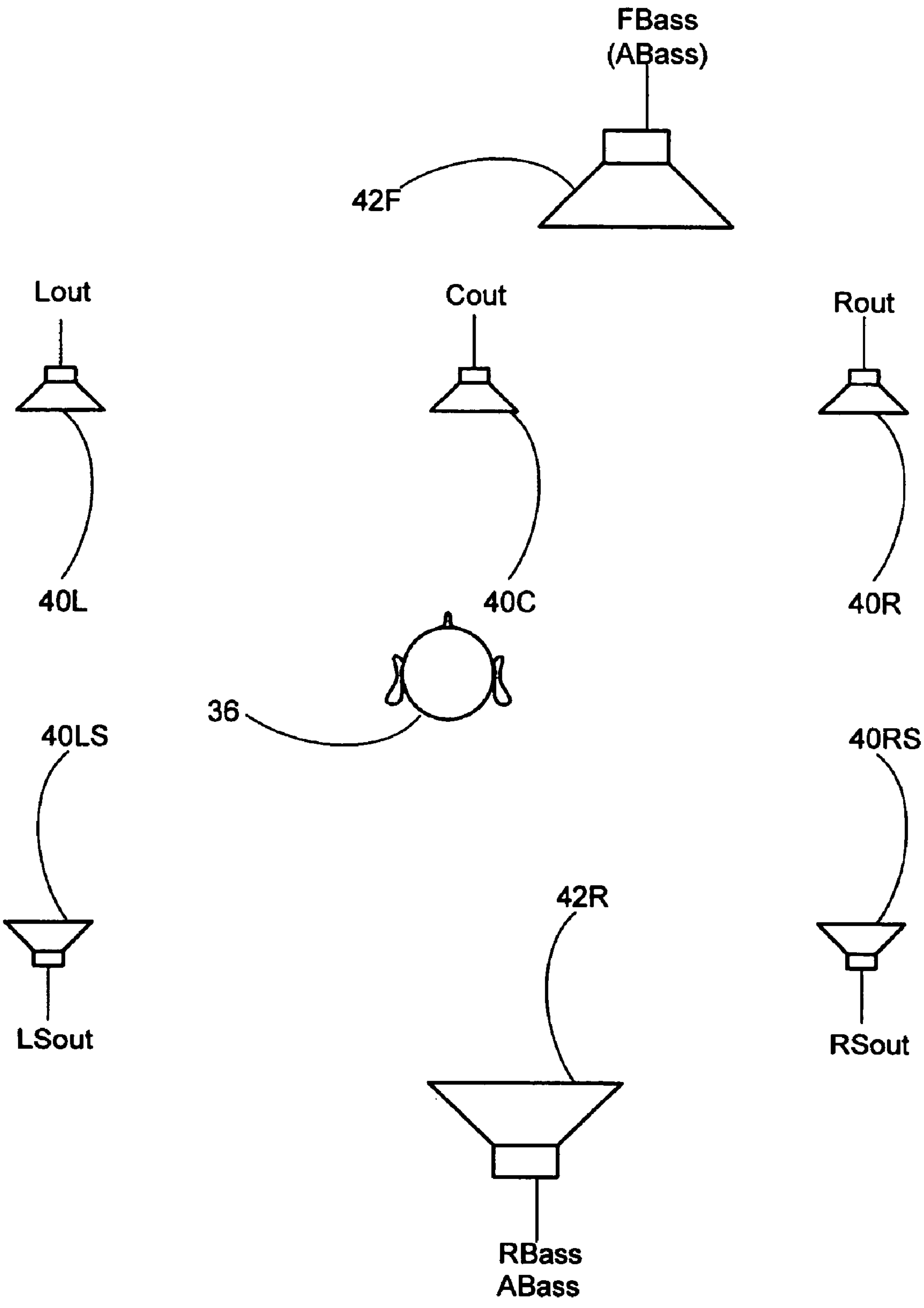

Referring to FIG. 4B, there is shown another exemplary playback system 12 of FIG. 1. This playback system includes limited range loudspeakers (such as tweeters, twiddlers, or mid-range loudspeakers or combinations thereof) 40L, 40C, and 40R, positioned in front of and to the left, center, and right, respectively of listener 36 in an intended listening position and limited range loudspeakers 40LS, 40RS positioned behind and to the left and right, respectively, of listener 36. The loudspeakers may have two or more acoustic drivers operating in different frequency ranges (for example a mid-range acoustic driver and an tweeter), with appropriate cross-over circuitry (not shown). Additionally, front subwoofer 42F is positioned at a convenient location in front of listener 36 and rear subwoofer 42R is positioned at a convenient location behind listener 36. Subwoofers also may have two or more acoustic drivers. Routing, mixing, and scaling circuitry 8 of FIG. 1 is configured to transmit to loudspeaker 40L audio stream Lout; to loudspeaker 40C audio stream Cout; to loudspeaker 40R Rout; to loudspeaker 40LS audio stream LSout; and to loudspeaker 40RS audio stream RSout. In addition, routing, mixing, and scaling circuitry 8 of FIG. 1 is configured to transmit to rear subwoofer 42R audio signal stream RBass, and to front subwoofer 42F audio signal stream FBass. Routing, mixing, and scaling circuitry 8 of FIG. 1 is also configured to transmit signal stream ABass to one or both of front subwoofer 42F and rear subwoofer 42R. As with the example of FIG. 4A, the routing, mixing, and scaling circuitry 8 of FIG. 1 may be configured to scale the audio signal streams to obtain the proper balance of acoustic energy corresponding to the several audio streams.

Figure 4C:
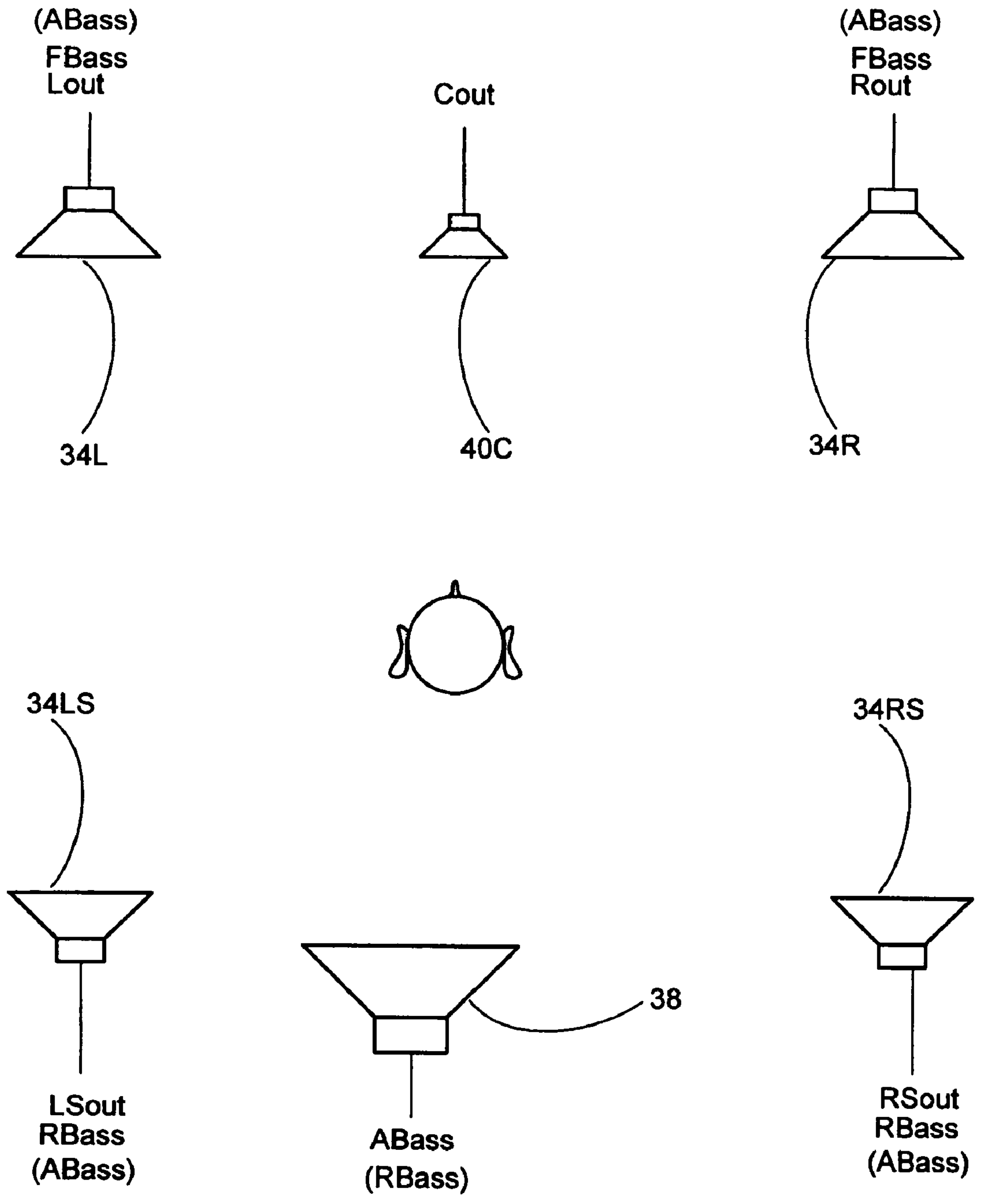

Other playback systems may be constructed by combining aspects of the implementations of the systems of 4A and 4B. For example, the playback system of FIG. 4C is similar to the playback system of FIG. 4A, except full range loudspeaker 34C of FIG. 4A has been replaced by a limited range loudspeaker 40C. Routing, mixing, and scaling circuitry 8 of FIG. 1 is configured to transmit to limited range loudspeaker 40C audio signal stream Cout. As with the systems of the previous figures, the routing, mixing, and scaling circuitry 8 of FIG. 1 may be configured to scale the audio signal streams to obtain the proper balance of acoustic energy corresponding to the several audio streams.

Figure 4D:
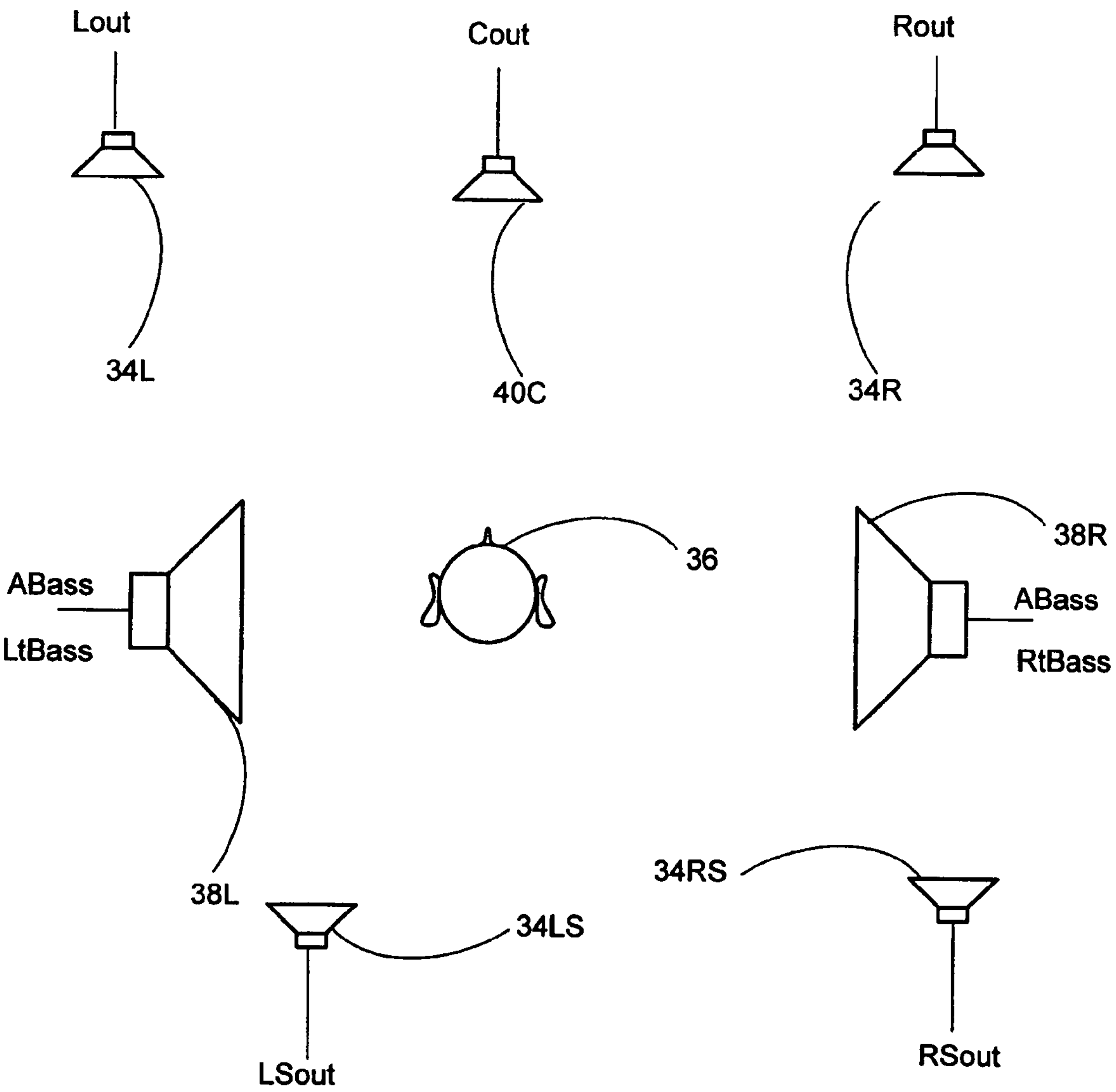

FIG. 4D shows another exemplary playback system 12, designed to be used with the circuitry of FIG. 2B. Routing, mixing, and scaling circuitry 8 of FIG. 1 is configured to transmit to limited range loudspeaker 34L audio signal stream Lout; to transmit to limited range loudspeaker 40C audio signal steam Cout; to transmit to limited range loudspeaker 34R audio signal stream Rout; to transmit to limited range loudspeaker 34LS audio signal stream LSout; to limited range loudspeaker 34RS audio signal stream RSout; to left subwoofer 38L audio signal stream ABass and LtBass; and to right subwoofer 38R audio signal streams ABass and RtBass.

Figure 4E:
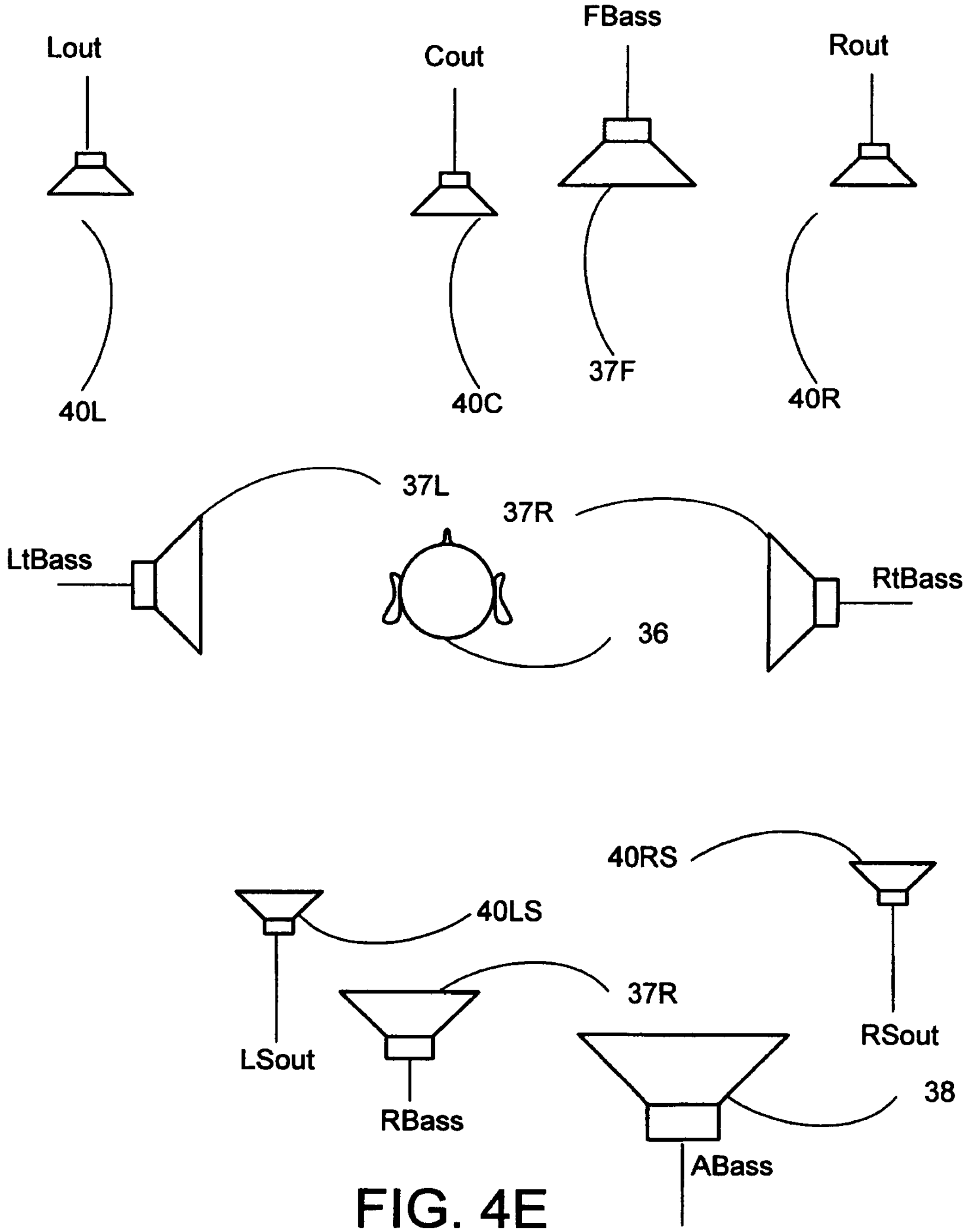

FIG. 4E shows yet another exemplary playback system 12. In FIG. 4E, channels Lout, Rout, Cout, LSout, and RSout are transmitted to limited range loudspeakers 34L, 34R, 40C, 34LS and 34RS, respectively. The low frequencies of the L, C, and R input channels have been combined to provide front bass audio signal stream FBass, which is transmitted to front bass loudspeaker 37F. The low frequencies of the C, L and LS input channels have been combined to provide left bass audio signal stream LtBass, which is transmitted to left bass loudspeaker 37L. The low frequencies of the LS and RS input channels have been combined to provide rear bass audio signal stream RBass, which is transmitted to rear bass loudspeaker 37R. The low frequencies of the C, R and RS channels have been combined to provide right bass audio signal stream RtBass, which is transmitted to right bass loudspeaker 37Rt. The very low frequencies of the input channels have been combined to provide audio signal stream ABass, which is transmitted to subwoofer 38. The implementation of FIG. 4E shows that any two or more adjacent channels can be combined to form a bass "zone"; that a channels may be included in more than one zone, or in other words that the zones may overlap; that the bass audio signal streams may be radiated by dedicated loudspeakers.

Aspects of the implementations of FIGS. 4A-4E can be combined to form many other configurations. If there is a subwoofer, the signal ABass transmitted to the subwoofer. In any of the implementations or variations of FIGS. 4A-4E in which only the ABass audio stream is transmitted to a subwoofer 38, the placement of a subwoofer such as subwoofer 38 is arbitrary. Depending on the placement of the subwoofer (s), and additional appropriate bass signal can be transmitted to the subwoofer. For example, in FIG. 4D, with subwoofers 38L and 38R placed to the left and right, respetively, of the listener, the left low frequency signal LtBass is transmitted to the left subwoofer 38L and the right low frequency signal RtBass is transmitted to the right subwoofer 38R.

Figure 5:
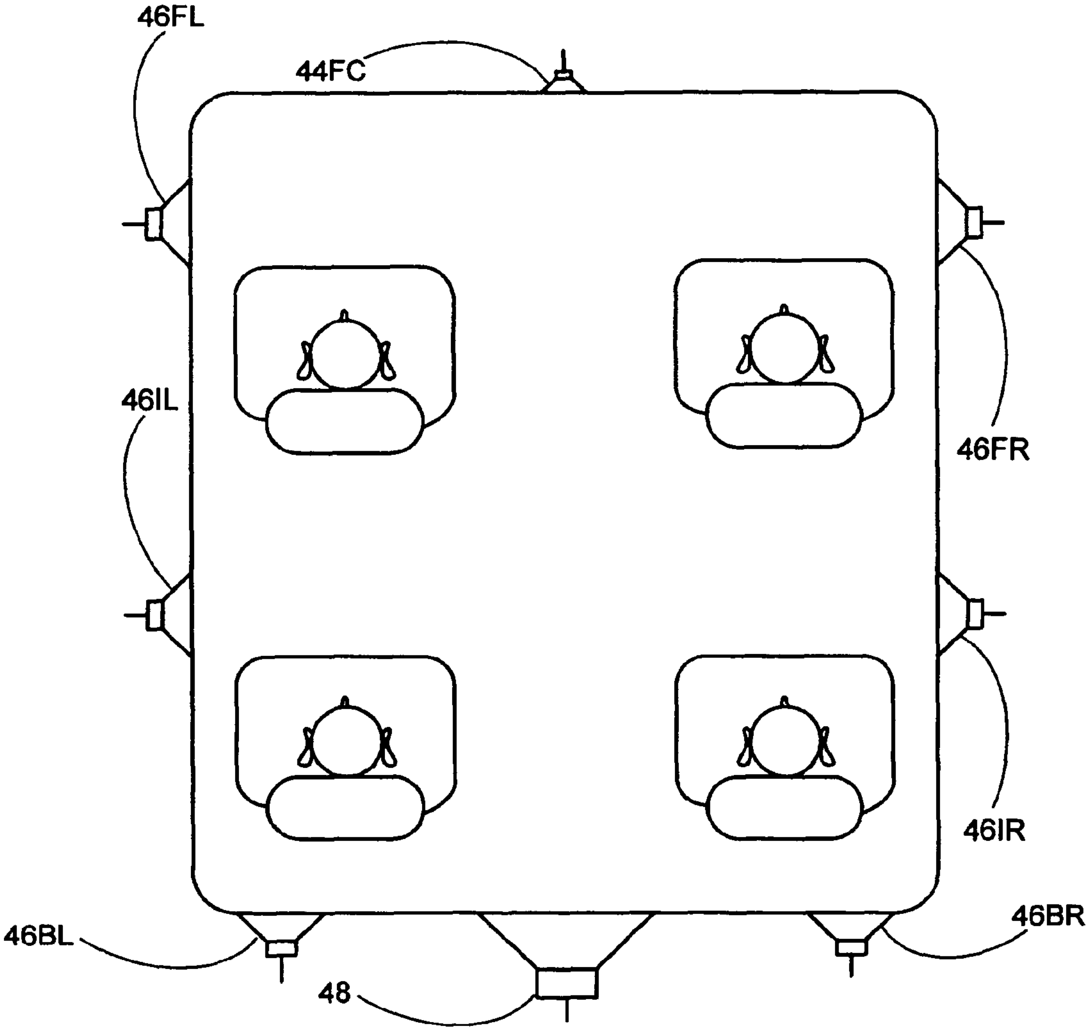
FIG. 5 is a diagrammatic view of the audio system implemented in a vehicle cabin.

Referring now to FIG. 5, there is shown a playback system 12 of FIG. 1, designed for a vehicle passenger cabin. An audio system according to the invention is especially advantageous in vehicle passenger cabins because of the limitations on the type of loudspeakers that can be installed and on the limitations of where the loudspeakers can be installed. In the playback system of FIG. 5, front center loudspeaker 44FC is a limited range speaker positioned near the lateral center of the instrument panel; front left loudspeaker 46FL and front right loudspeaker 46FR are full range loudspeakers installed in the front left and front right doors respectively; intermediate left loudspeaker 46IL and intermediate right loudspeaker 46IR are full range loudspeakers installed at intermediate locations, behind the front seat passenger locations and in front of the rear seat passenger locations, in the left rear door and right rear door, respectively; back left loudspeaker 46BL and back right loudspeaker 46BR are full range loudspeakers installed in the back of the vehicle in the parcel shelf on the left and right, respectively; and woofer 48 is installed in a convenient location, such as in the parcel shelf or under one of the seats. In other vehicle configurations, there may also be loudspeakers at other locations, and there may also be additional rows of seats.

Figure 6:
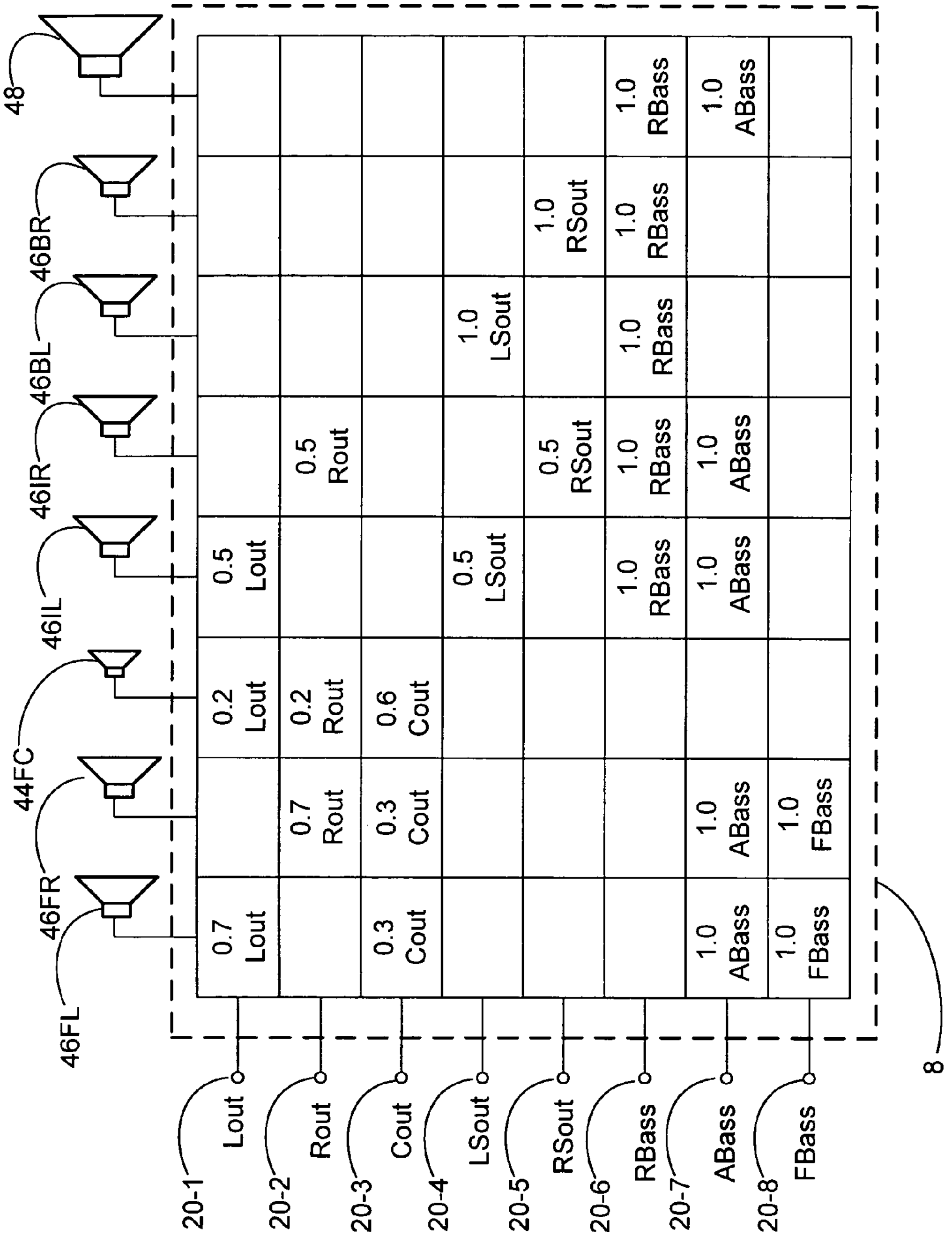
FIG. 6 is a block diagram of the audio system of FIG. 1, showing one of the elements in greater detail.

FIG. 6 shows routing, mixing, and scaling circuitry designed to be used with the playback system of FIG. 5. The routing mixing and scaling circuitry is configured to transmit audio signal streams to the loudspeakers of the playback system of FIG. 5 as shown in FIG. 7.

A loudspeaker system according to the invention is advantageous over conventional loudspeaker systems, because it provides better front/back separation and provides improved balance of bass energy, and allows for a wide range of loudspeaker frequency ranges and placement, especially in vehicle audio systems.

It is evident that those skilled in the art may now make numerous uses of and departures from the specific apparatus and techniques disclosed herein without departing from the inventive concepts. Consequently, the invention is to be construed as embracing each and every novel feature and novel combination of features disclosed herein and limited only by the spirit and scope of the appended claims.

What is claimed is:

1. In an audio system having a plurality of input channels, a method for processing audio signals comprising:

band pass filtering each of the plurality of input channels to provide band pass filtered audio signals corresponding to each of the plurality of input channels;

low pass filtering each of the plurality of input channels to provide low pass filtered audio signals corresponding to each of the plurality of input channels;

high pass filtering each of the plurality of input channels to provide high pass filtered audio signals corresponding to each of the plurality of input channels;

a first combinatorial processing of the band pass filtered audio signals corresponding to a first group of said plurality channels to provide a first bass audio signal stream including frequencies in a first spectral band;

a second combinatorial processing of the band pass filtered audio signals corresponding to a second group of said plurality of channels to provide a second bass audio signal stream including frequencies in said first spectral band; and a third combinatorial processing of the low pass filtered audio signals corresponding to said plurality of channels to provide a third bass audio signal stream including frequencies in a single second spectral band, said second spectral band including lower frequencies than said first spectral band.

2. A method for processing audio signals in accordance with claim 1, wherein said first combinatorial processing comprises combining front channels and wherein said second combinatorial processing comprises combining rear channels.

3. A method for processing audio signals in accordance with claim 1, wherein said first combinatorial processing comprises combining left hemisphere channels and wherein said second combinatorial processing comprises combining right hemisphere channels.

4. A method for processing audio signals in accordance with claim 1, wherein said first combinatorial processing comprises combining first adjacent directional channels of a multichannel audio system and wherein said second combinatorial processing comprises combining second adjacent channels of a multichannel audio system.

5. A method for processing audio signals in accordance with claim 1, further comprising transmitting said first bass audio signal stream to a first full range loudspeaker for transduction to acoustic energy corresponding to said first bass audio signal stream; and transmitting said second bass audio signal stream to a second full range loudspeaker for transduction to acoustic energy corresponding to said second bass audio signal stream.

6. A method for processing audio signals in accordance with claim 1, further comprising transmitting said third bass audio signal stream to a woofer or subwoofer loudspeaker for transduction to acoustic energy corresponding to said third bass audio signal stream.

7. A method for processing audio signals in accordance with claim 1, further comprising combining said second bass audio signal stream and said third bass audio signal stream to provide a combined bass audio signal stream.

8. A method for processing audio signals in accordance with claim 7, further comprising transmitting said combined audio signal stream to a first full range loudspeaker for transduction to acoustic energy.

9. A method for processing audio signals in accordance with claim 7, further comprising transmitting said combined audio signal to a woofer or subwoofer loudspeaker for transduction to acoustic energy.

10. A method for processing audio signals in accordance with claim 1, further comprising a first transmitting, of said first bass audio signal stream to a first loudspeaker; and second transmitting, of said second bass audio signal stream to a second loudspeaker; and a third transmitting, of said third bass audio signal stream to a third loudspeaker.

11. A method for processing audio signals in accordance with claim 10, further comprising combining said first bass audio stream, said second bass audio signal stream, and said third bass audio signal stream to provide a combined bass audio signal stream; and transmitting said combined bass audio signal stream to said third loudspeaker for transduction to acoustic energy corresponding to said combined bass audio signal stream.

12. A method for processing audio signals in accordance with claim 11, wherein said combining comprises scaling said first audio signal stream and said third bass signal stream.

13. A method for processing audio signals in accordance with claim 1, wherein said bandpass filtering comprises filtering said first combined audio signal with a band pass filter that has an upper break frequency of less than 300 Hz.

14. A method for processing audio signals in accordance with claim 1, wherein said third combinatorial processing comprises combining said plurality of channels to create a combined signal and filtering said combined signal with a filter that attenuates frequencies above about 80 Hz.

15. A method for processing audio signals in accordance with claim 14, wherein said filtering comprises filtering with a low pass filter.

16. A multichannel audio system comprising:

a plurality of input channels;

a band pass filter, for filtering audio signals in each of the plurality of input channels to provide band pass filtered audio signals corresponding to each of the plurality of input channels;

a low pass filter for filtering each of the plurality of input channels to provide low pass filtered audio signals corresponding to each of the plurality of input channels;

high pass filtering each of the plurality of input channels to provide high pass filtered audio signals corresponding to each of the plurality of input channels;

first combining circuitry, for combining audio signals corresponding to a first group of the plurality channels to provide a first bass audio signal stream including audio signals in a first spectral band;

second combining circuitry, for combining audio signals corresponding to a second group of the plurality channels to provide a second bass audio signal stream including audio signals in said first spectral band; and third combining circuitry, for combining said low pass filtered audio signals corresponding to the plurality of input channels to provide a third bass audio signal stream including frequencies in a single second spectral band, said second spectral band including lower frequencies than said first spectral band.

17. A multi-channel audio system in accordance with claim 16, wherein said first combining circuitry comprises elements for combining front channels and wherein said second combining circuitry comprises elements for combining rear channels.

18. A multi-channel audio system in accordance with claim 16, wherein said first combining circuitry comprises elements for combining left hemisphere channels and the second combining circuitry comprises elements for combining right hemisphere channels.

19. A multi-channel audio system in accordance with claim 16, further comprising first transmitting circuitry, for transmitting said first bass audio signal stream to a first full range loudspeaker for transduction to acoustic energy corresponding to said first bass audio signal stream; and second transmitting circuitry, for transmitting said second bass audio signal stream to a second full range loudspeaker for transduction to acoustic energy corresponding to said second bass audio signal stream.

20. A multi-channel audio system in accordance with claim 16, further comprising third transmitting circuitry, for transmitting said third bass audio signal stream to a woofer or subwoofer loudspeaker for transduction to acoustic energy corresponding to said third bass audio signal stream.

21. A multi-channel audio system in accordance with claim 16, further comprising fourth combining circuitry for combining said second bass audio signal stream and said third bass audio signal stream to provide a combined bass audio signal stream.

22. A multi-channel audio system in accordance with claim 21, further comprising fourth transmitting circuitry for transmitting said combined audio signal stream to a first full range loudspeaker for transduction to acoustic energy.

23. A multi-channel audio system in accordance with claim 21, further comprising fifth transmitting circuitry for transmitting said combined audio signal to a woofer or subwoofer loudspeaker for transduction to acoustic energy.

24. A multi-channel audio system in accordance with claim 16, further comprising first transmitting circuitry, for transmitting said first bass audio signal stream to a first loudspeaker; second transmitting circuitry, for transmitting said second bass audio signal stream to a second loudspeaker; and third transmitting circuitry, for transmitting said third bass audio signal stream to a third loudspeaker.

25. A multi-channel audio system in accordance with claim 24, further comprising transmitting circuitry for transmitting said second audio signal stream to said third loudspeaker; combining circuitry, for combining said first audio signal stream with said bass audio signal streams to provide a combined audio signal stream; and transmitting said combined audio signal stream to said third loudspeaker.

26. A multi-channel audio system in accordance with claim 25, wherein said combining circuitry comprises a scaler for scaling said first audio signal stream and said third bass signal stream.

* * * * *